July 4, 1961
D. J. COLLOM
2,991,401
MOTOR CONTROL CIRCUIT
Filed July 9, 1958
3 Sheets-Sheet 1
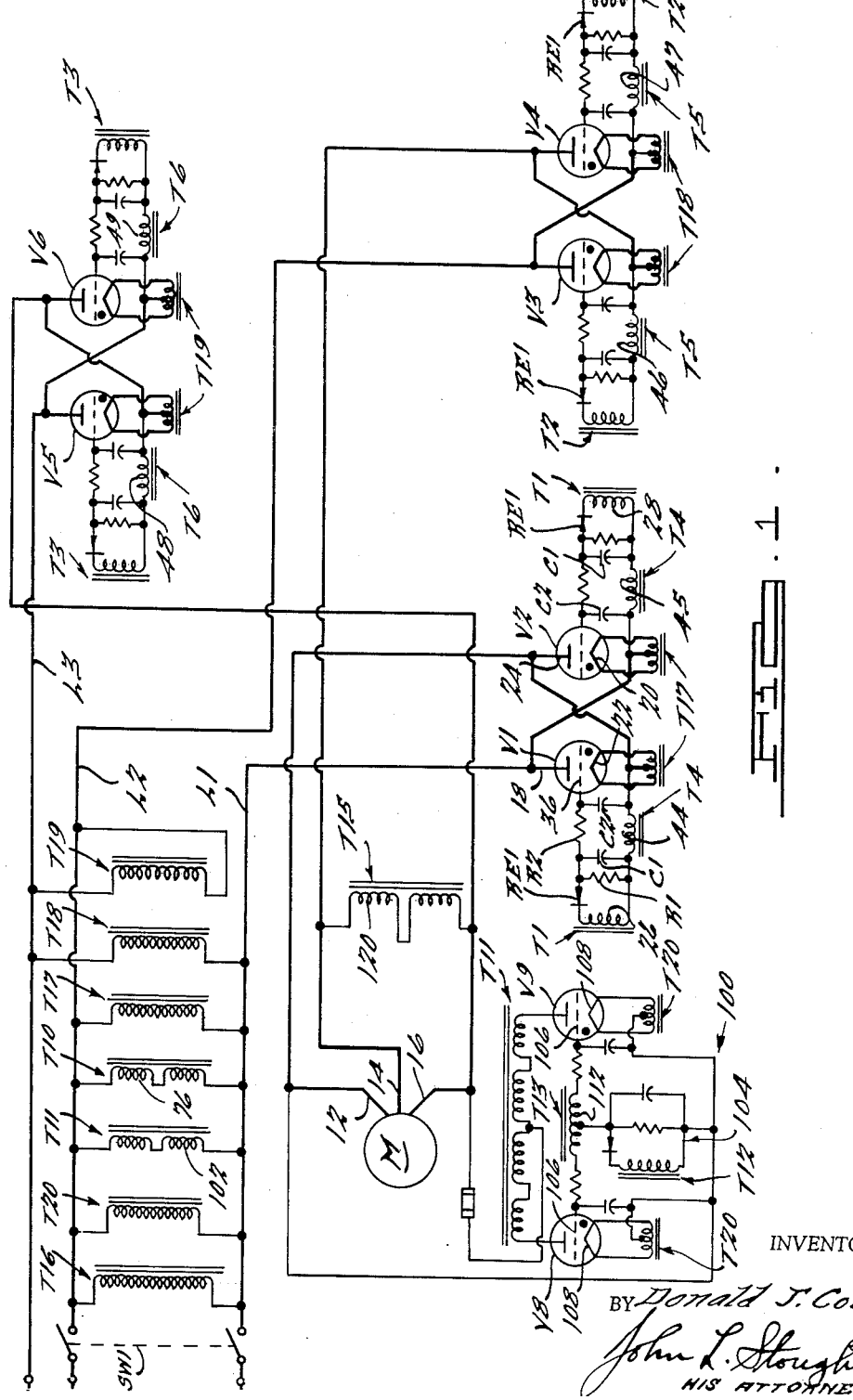
INVENTOR.
BY Donald J. Collom.
John L. Stoughton
HIS ATTORNEY

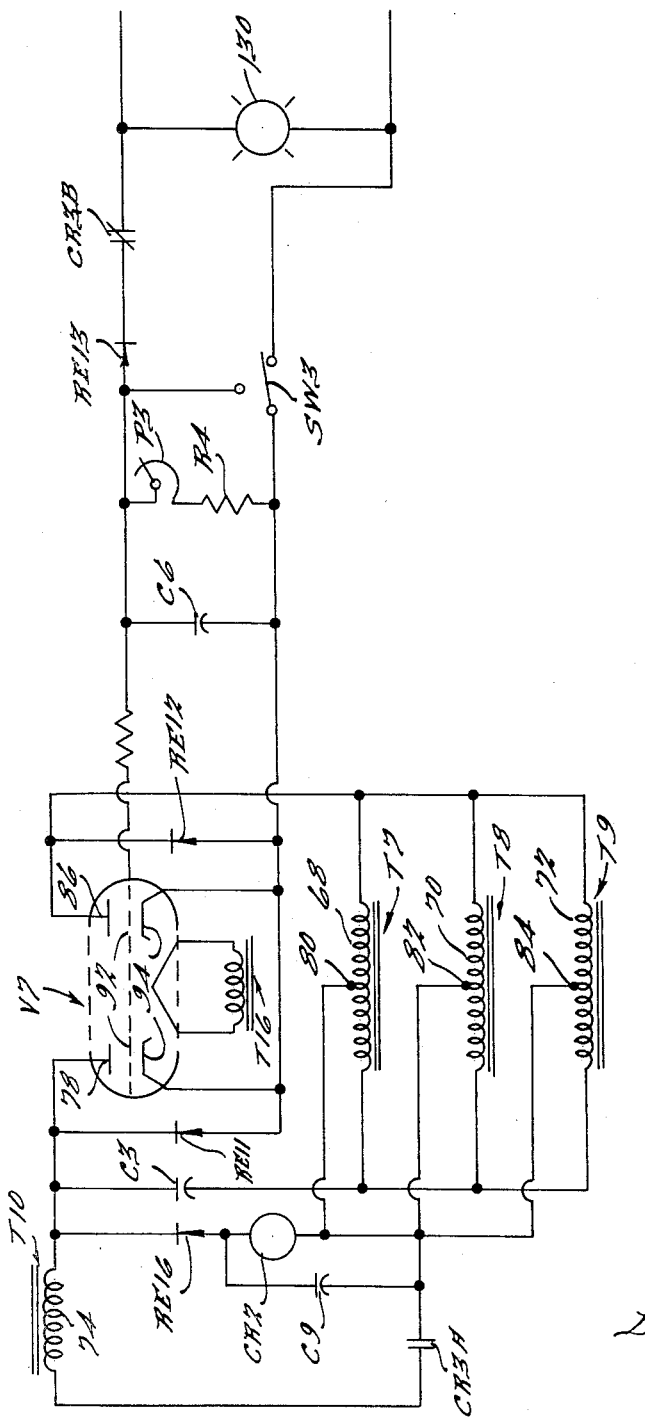

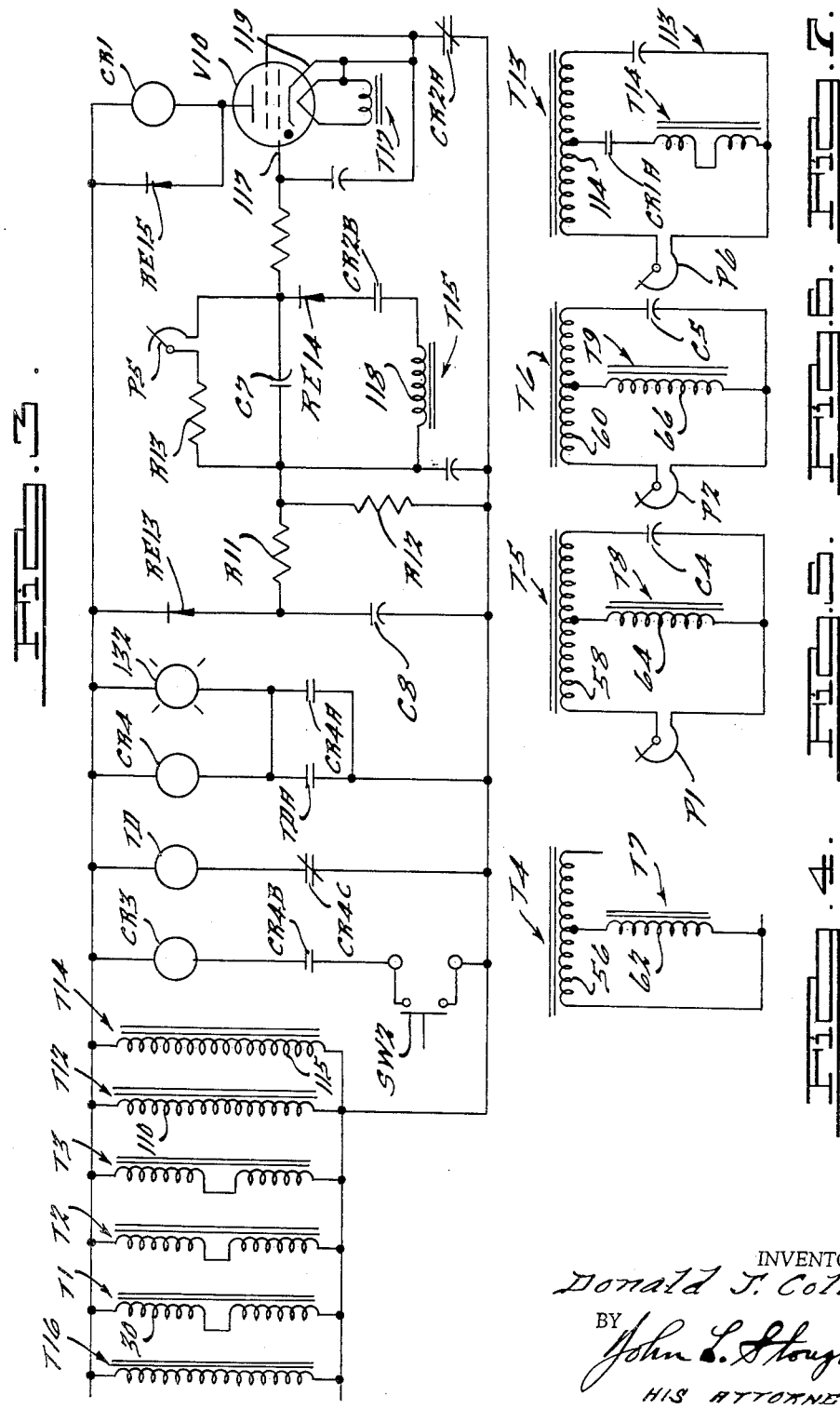

United States Patent Office
2,991,401
Patented July 4, 1961

2,991,401
MOTOR CONTROL CIRCUIT
Donald J. Collom, Bloomfield Township, Oakland County, Mich., assignor to Weltronic Company, Detroit, Mich., a corporation of Michigan
Filed July 9, 1958, Ser. No. 747,483
15 Claims. (Cl. 318—212)

This invention relates to an improved control circuit for an alternating current motor and more particularly to an improved circuit including phase variation means for controlling the flow of electric current to an alternating current motor during the starting thereof.

One important object of the present invention is to provide an improved motor control circuit.

Another object is to provide an improved circuit for controlling the starting current of a polyphase alternating curent motor including a single variable impedance device arranged for controlling the currents in all of the phases.

Another object is to provide an improved circuit for controllably supplying direct current to an alternating current motor for braking it.

Another object is to provide an improved starting current control and braking current control circuit for an alternating current motor.

Another object is to provide an improved circuit for controllably supplying direct current to an alternating current motor for braking it and including means for lmiting the amount of braking current and also for controlling the time for which it is applied to the motor.

Another object is to provide an improved circuit for controllably supplying direct current to an alternating current motor for braking it, in which the direct current can be supplied to the motor only when the motor is running, thereby minimizing the possibility of damaging the motor by passing excess direct currents through its windings.

Still another object is to provide an improved starting current control and braking current control circuit for an alternating current motor, in which the flow of braking current is controlled by a circuit having decay characteristics, and in which a chargeable element is charged and maintained in a charged condition only while the motor is running, the circuit being arranged so that when the energizing current to the motor is cut off the decay characteristics control the application of a braking current to the motor, thereby stopping the motor and also cutting off the flow of braking current as the motor stops.

The foregoing and other objects and advantages of the present invention will become apparent by a reading of the following description taken in conjunction with the drawings wherein:

FIGURE 1 is a schematic circuit diagram of a portion of a motor control circuit according to a preferred embodiment of the present invention;

FIG. 2 is a schematic circuit diagram of a second portion of the motor control circuit partly shown in FIG. 1;

FIG. 3 is a schematic diagram of another portion of the circuit shown in FIGS. 1 and 2;

FIG. 4 is a schematic circuit diagram of another portion of the circuit shown in the preceding figures;

FIG. 5 is a schematic circuit diagram of still another portion of the circuit shown in the preceding figures;

FIG. 6 is a schematic circuit diagram of yet another portion of the circuit shown in the preceding figures; and FIG. 7 is a schematic circuit diagram of yet another portion of the circuit shown in the preceding figures.

The circuit of the preferred embodiment of the invention as shown in the drawings is arranged for controlling the current supply for a three phase alternating current motor M which may be of any desired type. The main power circuit for driving the motor M is indicated by heavy lines and includes three pairs of inverse parallel connected, grid controlled rectifier tubes V1—V6 which may be, for example, thyratron tubes of the type commercially designated C6J. The bias on these tubes V1—V6 is controllably varied during the starting period of the motor M to control the starting current therein and to provide for smooth acceleration of the motor.

The circuit is symmetrical and balanced insofar as the three phase power supply to the motor M is concerned. The main power lines L1, L2 and L3 are connected to any convenient source of three phase alternating current (not shown) through a disconnect switch S-1. The gas tubes V1—V6 are connected in pairs between the lines L1 to L3 and the motor terminals 12, 14, and 16, respectively. The first line L1 is connected directly to the plate 18 of the first tube V1 and to the cathode 20 of the second tube V2. The cathode 22 of the first tube V1 and the plate 24 of the second tube V2 are connected to the first terminal 12 of the motor, so that during operation the tubes V1 and V2 become conductive alternately on successive half cycles of the input voltage and thus deliver full wave alternating current to the motor terminal 12. The second pair of tubes V3 and V4 are similarly connected between the second line L2 and the second motor terminal 14, and the third pair of tubes V5 and V6 are connected between the third line L3 and the third motor terminal 16.

Separate biasing circuits are connected between the grids and cathodes of the gas tubes V1—V6, including separate sources of D.C. potential of sufficient magnitude to hold the tubes at cut-off in the absence of an impressed signal. In the cases of the tubes V1 and V2, for example, the direct current biasing voltage is generated by separate secondary windings 26 and 28 of a transformer T1, the primary winding 30 (FIG. 3) of which is connected in the control portion of the circuit and is constantly energized during operation thereof. The secondary winding 26 of the transformer T1 is connected in series with a unidirectional curent device RE1 and a resistor R1 and develops a D.C. potential across the resistor R1. The normally negative terminal of the resistor R1 is connected to the grid 36 of the gas tube V1, and the normally positive terminal of the resistor R1 is connected to the cathode 22 of the tube V1. A filter including a capacitor C1 and a resistor R2 is connected between the grid 36 and the cathode 22 for reducing the ripple voltage of the rectifier. Another capacitor C2 is connected between the grid 36 and the cathode 22 to minimize the effect of voltage transients on the gas tube V1.

Separate transformers T2 and T3 are provided for the two other pairs of gas tubes V3 and V4, and V5 and V6, respectively, for generating a D.C. bias voltage therefor. The magnitude of the voltages developed by the rectifier circuits is such that in the absence of an applied signal these tubes V1—V6 are completely cut off and prevent the flow of any current from the lines L1, L2 and L3 to the motor M.

During starting of the motor M, the tubes V1—V6 are controllably rendered conductive, or fired by signals developed across secondary transformer windings 44, 45, 46, 47, 48, and 49, which are series connected in the grid circuits of the respective tubes V1—V6. The secondary windings 44 to 49 are inactive during idle time and braking time of the motor M and are energized only while the motor is energized. During operation, alternating voltages are developed in the secondary windings 44 to 49, and the phase angles of these voltages are controllably varied relative to the plate to cathode voltages of the respective tubes, thereby controlling the firing angles of the tubes V1—V6.

According to the present invention, the secondary windings 44 to 49 are energized by a common phase shift circuit of the type shown in Patent No. 2,523,167 to G. E. Undy, including a dual triode vacuum tube V7 (FIG. 2) operated as a variable resistance circuit element. The secondary windings 44 and 45 associated with the first pair of gas tubes V1 and V2 are wound on a transformer T4 (FIG. 4). The windings 46 and 47 associated with the second pair of gas tubes V3 and V4 are wound on a transformer T5 (FIG. 5) and the windings 48 and 49 in the grid circuits of the third pair of gas tubes V5 and V6 are wound on another transformer T6 (FIG. 6).

The primary windings 56, 58 and 60 of the transformers T4, T5 and T6 are center tapped and are connected in subsidiary circuits for energization by secondary windings 62, 64 and 66 of three phase controlled transformers T7, T8, and T9, the primary windings 68, 70 and 72 of which are connected in parallel in the phase shift circuit shown in FIG. 2. The voltages of the transformers T4, T5, and T6 are all in phase with each other, and may be varied in phase by approximately 180° by varying the resistance of the vacuum tube V7. The voltages across the different pairs of the gas tubes V1—V6 are in 120° phase relation to each other, and it is, therefore, necessary to develop similarly related signal voltages across the transformer secondaries 44 to 49 for properly firing the gas tubes V1—V6. To this end, the subsidiary circuits shown in FIGS. 4, 5, and 6 are arranged to establish a fixed 120° phase difference between the outputs of the transformers T4, T5, and T6 even though the input voltages to the subsidiary circuits are all in phase with each other.

The variable phase shift circuit shown in FIG. 2 and including the vacuum tube V7 is energized by a secondary winding 74 of a transformer T10, the primary winding 76 of which is connected between the main power lines L1 and L2. One terminal of the secondary winding 74 is connected to the left-hand plate 78 of the dual triode V7 and to a capacitor C3. The opposite terminal of the winding 74 is connected through a pair of relay contacts CR3A to the center taps 80, 82 and 84 of the primary windings 68, 70 and 72 of the controlled transformers. The primary windings 68, 70 and 72 are connected in parallel, each having one end terminal connected to the capacitor C3 and its opposite terminal connected directly to the right plate 86 of the vacuum tube V7. Unidirectional current devices such as the dry plate rectifiers RE11 and RE12 are connected between the plates and cathodes of the two sections of the vacuum tube V7 to provide a reverse current path in the conventional manner.

The phase of the voltage across the primary windings 68, 70 and 72 of the controlled transformers relative to the voltage of the transformer T10 is controlled by varying the grid bias on the vacuum tube V7 in order to vary the effective resistance of the vacuum tube V7. As shown in FIG. 4, the first grid transformer T4 is connected for in-phase operation with the transformer T7, and the signal voltage output of the secondary windings 44 and 45, which directly controls the firing angle of the first two gas tubes V1 and V2, is substantially in phase with the voltages across the first transformer T7.

The voltages across the other two grid transformers T5 and T6 are 120° out of phase with each other and with the voltage across the first grid transformer T4, so that corresponding control of the gas tubes V3 and V4, and V5 and V6 is accomplished in the desired phase relationship with the voltages appearing across those tubes. The 120° phase displacement of the transformers T5 and T6 is accomplished by the subsidiary phase shift circuits shown in FIGS. 5 and 6, which are generally similar to each other in arrangement and differ only in the degree of phase shift they accomplish to provide properly phased control voltages for firing their respective gas tubes V3 to V6.

The end terminals of the primary winding 58 of the grid transformer T5 are connected to a capacitor C4 and to a potentiometer P1, respectively. One terminal of the secondary winding 64 of the transformer T8 is connected to the potentiometer P1 and to the capacitor C4. The other terminal of the secondary winding 64 is connected to the center tap of the grid transformer primary winding 58. By varying the setting of the poteniometer P1, the voltage across the grid transformer primary winding 58 may be shifted through a phase angle of about 180°. In practice, the potentiometer is adjusted for a phase shift of either 120° or 60° depending on the phase relationship between the currents in the lines L1 and L2, and the orientation of the transformer T8, thus providing a phase difference of 120° between the voltage across the transformer T5 and the voltage across the transformer T4.

The primary winding 60 of the third grid transformer T6 is connected in an exactly similar phase shift circuit, which includes the potentiometer P2, the capacitor C5, and the secondary winding 66 of the transformer T9. The potentiometer P2 is adjusted to provide a 120° phase angle between the voltage across the transformer T6 and the voltages across the transformer T4 and the transformer T5.

The gas tubes V1—V6 are thus controlled by a single variable phase shift circuit, working through two subsidiary phase shift circuits to provide for three phase operation. For commercial reasons, the grid transformer T4 is connected in its own subsidiary circuit as shown in FIG. 4. Alternatively, the grid secondary windings 44 and 45 could be wound directly on the transformer T7 in the main phase shift circuit (FIG. 2) since they operate substantially in phase with the transformer T7.

Referring now to FIG. 2, the grid bias on the variable phase shift vacuum tube V7 is controlled by an RC network including a capacitor C6, a resistor R4, and a potentiometer P3. The capacitor C6 is connected, in parallel with the resistor R4 and the potentiometer P3, between the grids 92 and the cathodes 94 of the variable resistance vacuum tube. During the idle periods of the motor M, the capacitor C6 is charged to a predetermined voltage sufficient to keep the vacuum tube V7 non-conductive. When the motor M is started, the capacitor C6 is disconnected from its charging circuit, and its charge is dissipated through the potentiometer P3 and the resistor R4, gradually bringing the grids 92 up to the cathode potential and thereby increasing the conductivity of the tube V7. The potentiometer P3 is adjustable to vary the acceleration rate of the motor M by varying the decay rate of the capacitor C6. Further details of this circuit will be described in connection with the description of the operation of the circuit, following the description of the breaking portion of the circuit.

Direct current for braking the motor M is controlled by the portion of the circuit shown in FIG. 3, in conjunction with the rectifier circuit 100 shown in FIG. 1. The direct current for motor braking is supplied to the motor terminals 12 and 16 through the full-wave, grid controlled rectifier 100, which is energized by the transformer T11, the primary winding 102 of which is connected between the main power lines L1 and L2. The rectifier 100 includes a pair of grid-controlled gas tubes V8 and V9, which may be of the thyratron type commercially designated C6J similarly to the tubes V1—V6, and which are normally biased beyond cut-off by a half-wave rectifier 104 connected between the grids 106 of the tubes and their cathodes 108. The rectifier 104 is energized in the embodiment shown by a transformer T12, the primary 110 of which is shown in FIG. 3.

Firing of the rectifier tubes V8 and V9 is controlled by a secondary winding 112 of the transformer T13, the primary winding 114 of which is connected in a phase shift circuit 113 (FIG. 7) of the Undy type energized by a transformer T14. The primary winding 115 (FIG. 3) of the transformer T14 is constantly energized during operation. During the braking period, the phase shift between the voltage across the transformer T14 and the voltage across the transformer T13 determines the firing point in the alternating current cycle at which the gas tubes V8 and V9 conduct, and thereby determines the amount of direct current applied to the motor for braking it.

The length of the braking period is controlled by the circuit at the right-hand part of FIG. 3 including the gas tube V10, which controls the energization of the phase shift circuit 13 (FIG. 7) and thus controls the time during which the rectifier 100 conducts current.

A control relay CR1 is series-connected in the plate circuit of the gas tube V10, and is energized by the plate current of the tube whenever the tube is conducting. The tube V10 is normally held in a non-conducting condition while the motor M is energized, and is rendered conductive when the motor is initially de-energized. The normally closed contacts CR2A of a control relay CR2 are connected in series in the cathode circuit of the tube V10. The winding of the control relay CR2 is connected in series with the control relay contacts CR3A for energization by the transformer T10 at all times while energizing current is being supplied to the motor M, so that the contacts CR2A are open whenever the motor is energized, thus preventing the flow of plate current in the gas tube V10.

After the contacts CR3A open, de-energizing the main phase shift circuit and thus cutting off the flow of driving current to the motor M, the relay CR2 is de-energized and its contacts CR2A close, permitting plate current to flow in the gas tube V10. Braking current is supplied to the motor M only during the time the gas tube V10 remains conductive, and after the relay contacts CR2A close, the tube V10 remains conductive only until the charge on a capacitor C7 in its grid circuit decays to a predetermined value.

A constant D.-C. biasing potential is applied between the grid 117 and the cathode 119 of the gas tube V10 by a rectifier and voltage divider network including the rectifier device RE13, the resistors R11 and R12, and a filter capacitor C8. The biasing potential is of sufficient magnitude to keep the tube V10 non-conductive in the absence of any opposing voltage, and the tube V10 is rendered conductive for the desired times by such an opposing voltage, which is developed across the capacitor C7. The capacitor C7 is connected in series between the voltage divider resistors R11 and R12 and the grid 117 of the tube, and also in parallel with a resistor R13 and a potentiometer P5. The capacitor C7 is charged through a rectifier device R14 in a direction to oppose the D.-C. biasing voltage and to make the tube V10 conductive by the secondary winding 118 of a transformer T15, the primary winding 120 of which is connected between two of the motor terminals 14 and 16. The transformer T15 is energized only while the motor M is energized, and to insure against back E.M.F. effects, normally open relay contacts CR2B are connected in series with the secondary winding 118. Opening of the contacts CR2B also insures that all of the discharge current of the capacitor C7 flows through the resistor R13 and the potentiometer P5, and that none leaks through the rectifier device R14 and the winding 118.

In operation when the motor energizing current is cut off, the relay CR2 is also de-energized, closing its contacts CR2A, thereby closing the plate current circuit of the tube V10. At this time, the capacitor C7 is fully charged, so the tube V10 conducts and energizes the relay CR1, closing its contacts CR1A (FIG. 7) and thereby energizing the transformer T13 which controls the rectifier circuit 100 and renders it conductive so that braking current is supplied to the motor M.

The capacitor C7 discharges through the potentiometer P5 and the resistor R13, and as soon as its charge is sufficiently reduced, the tube V10 becomes non-conductive, thereby de-energizing the control relay CR1 and cutting off the brake current. A rectifier device RE15 is connected in parallel with the winding of the control relay CR1 to permit current to continue to flow through the winding in response to its inductance during the half-wave portions of the energizing voltage during which the tube V10 is non-conductive, and thus to smooth out the current flow through the winding.

The control portion of the conduit, that is, all of the circuit shown in FIG. 3, and the biasing circuit for the variable resistance vacuum tube V7 is energized by a transformer T16, the primary winding of which is connected between two of the main power lines L1 and L2. The various filament heaters (not separately designated) of the discharge tubes illustrated are heated by currents supplied from transformers as indicated by the appropriately designated reference characters in the drawings.

In operation, the line switch S1 is first closed to energize the circuit. This energizes the "power on" signal lamp 130 (FIG. 2) and also energizes the time delay relay TD and all of the filament transformers T16 to T20. When the time delay relay TD times out, the time being set to allow for adequate warm-up of the tubes, the contacts TDA (FIG. 3) close, energizing the control relay CR4 and the "time delay over" indicating light 132. The first contacts CR4A of the control relay CR4 close to hold the control relay CR4 closed. The second contacts CR4B close and thereby enable the circuit for energizing the control relay CR3, and the third contacts CR4C open to de-energize the time delay relay TD. The circuit is now in condition for energizing and braking the motor M.

At this time, the gas tubes V1—V6 in the motor circuit are maintained non-conductive by the half-wave rectifiers in their grid circuits, and the variable resistance tube V7 is cut off, both by the bias on its grids 92, and by the normally open contacts CR3A of the control relay CR3. The braking time control tube V10 is held at cut-off by the biasing power supply including the rectifier device RE13. The transformer T15, which charges the braking time capacitor C7 is not energized because there is no voltage present at the motor terminals 14 and 16. The braking tube V10 is, therefore, non-conductive even through the relay CR2 is de-energized and the contacts CR2A are closed.

To start the motor M, the switch SW2 (FIG. 3) is closed to energize the control relay CR3. This closes the relay contacts CR3A (FIG. 2) and opens the contacts CR3B. Closing of the contacts CR3A connects the transformer T10 in the main phase shift circuit and applies voltage to the primary windings 68, 70, and 72 of the phase shift transformers T7, T8 and T9. Opening of the contacts CR3B disconnects the source of charging current from the capacitor C6 in the grid circuit of the variable resistance tube V7, and the grid bias on the tube V7 begins to decrease in magnitude as the capacitor C6 discharges through the potentiometer P3 and the resistor R4. As the variable resistance tube V7 becomes increasingly conductive, the gas tubes VI—V6 fire at progressively earlier points in the cycle of the input voltage and current pulses of increasing duration and magnitude are supplied to the motor M. The motor M accelerates up to its rated speed and continues to operate as long as the switch SW2 is maintained in its closed position.

A double throw, single pole switch SW3 is included in the grid cricuit of the variable resistance tube V7 for alternative operation without acceleration control of the motor M. When the switch SW3 is in its first position as shown, the circuit operates as hereinabove described. When the switch SW3 is thrown to its second position, the charging circuit for the capacitor C6 is opened and the grids 92 of the tube V7 are connected directly to the cathodes 94. In this condition, there is no gradual build up of motor energizing current, but instead, full power current pulses are supplied to the motor M as soon as the "start" switch SW2 is closed.

Closing of the control relay contacts CR3A also energizes the control relay CR2 through the rectifier device RE16, and charges a capacitor C9 which is connected in parallel with the relay CR2. When the relay CR2 is energized, its contacts CR2A (FIG. 3) are opened to open the cathode circuit of the gas tube V10 to keep the braking circuit in a disabled condition. While the motor is operating, the transformer T15 is energized and charges the capacitor C7, thereby applying a positive voltage to the grid 117 of the tube V10 relative to its cathode 119, and placing the tube V10 in a conductive condition so that it will conduct immediately upon closing of the contacts CR2A.

When now the control switch SW2 is opened, the relay CR3 is de-energized and its contacts CR3A open, opening the circuits of the transformers T7, T8, and T9 and thus removing the firing voltages from the gas tubes V1—V6 so that these tubes V1—V6 become non-conductive and driving current is no longer supplied to the motor M. The capacitor C9 discharges through the relay winding CR2, holding this relay closed for a short delay period following the opening of the control relay contacts CR3A to insure against the application of braking current to the motor before the main gas tubes V1—V6 are fully cut off.

When the control relay CR2 is de-energized after this short delay period, its contacts CR2A close to permit plate current to flow in the gas tube V10. The contacts CR2B open thereby isolating the decay circuit of the capacitor C7 from its charging transformer T15. With the closing of the contacts CR2A the tube V10 becomes conductive, thereby energizing the control relay CR1. The contacts CR1A (FIG. 7) then close to energize the phase shift circuit 113 and thus to fire the rectifier 100, which supplies braking current to the motor winding connected between the terminals 12 and 16.

The magnitude of the braking current may be adjusted by manual adjustment of the potentiometer P6 in the phase shift circuit 113. The length of time the braking current is supplied to the motor M is adjustable by varying the discharge time constant of the capacitor C7 in the grid circuit of the gas tube V10. When the capacitor C7 becomes discharged, the tube V10 becomes non-conductive and the relay CR1 is de-energized. The discharge time constant for the capacitor C7 may be adjusted by varying the setting of the potentiometer P5, and will usually be adjusted in correlation with the potentiometer P6 in the braking current phase shift circuit. In general, the larger the braking current the less time will be required to bring the motor M to a stop, and also it is usually desirable to minimize the total energy used for braking in order to minimize the heating effect thereof. Therefore, in operation, it is usually desirable to set the braking current potentiometer P6 to provide just enough braking current to stop the motor M in the required time, and then to set the braking time potentiometer to cut off the braking current as soon as the motor has stopped.

It should be especially noted that in the circuit according to the invention braking current cannot be applied to the motor M except immediately upon de-energization thereof, and braking current cannot be inadvertently applied after the motor has come to a stop. The arrangement of the transformer T15 with its primary winding 120 connected across two of the motor terminals insures that in the absence of energizing voltage for the motor M, the braking current control tube V10 remains cut off, since the transformer T15 must be energized in order to make the tube V10 conductive.

What is claimed is:

1. A polyphase A.C. motor control circuit comprising means for connecting a polyphase A.C. motor to a polyphase alternating current source, means for producing a first alternating signal, variable phase shift means for varying the phase of said signal, subsidiary phase shift means for producing a second signal responsively to said first signal and at a preselected phase angle relative thereto, means for controlling the current in a first phase between the motor and the source responsively to said first signal, and means for controlling the current in a second phase between the motor and the source responsively to said second signal.

2. A polyphase A.C. motor control circuit comprising means for connecting a polyphase A.C. motor to a polyphase alternating current source, means for producing a first alternating signal, variable phase shift means for varying the phase of said signal, subsidiary phase shift means for producing a second signal responsively to said first signal and at a preselected phase angle relative thereto, means for adjusting said subsidiary phase shift means to make said preselected phase angle substantially equal to the phase angle between first and second phases of the source, means for controlling the current in a first phase between the motor and the source responsively to said first signal, means for controlling the current in a second phase between the motor and the source responsively to said second signal, and means for controllably varying said variable phase shift means during starting acceleration of the motor to provide a gradually increasing flow of current to the motor.

3. A polyphase A.C. motor control circuit comprising means for connecting a polyphase A.C. motor to a polyphase alternating current source, means for producing a first alternating signal, variable phase shift means for varying the phase of said signal, subsidiary phase shift means for producing additional signals responsively to said first signal and displaced in phase from said first signal at angles substantially equal to the phase angles of the source, means for controlling the current in a first phase between the motor and the source responsively to said first signal, and means for controlling the currents in the other phases between the motor and the source responsively to different respective ones of said additional signals.

4. A polyphase A.C. motor control circuit comprising means for connecting a polyphase A.C. motor to a polyphase alternating current source, means for producing a first alternating signal, variable phase shift means for varying the phase of said signal, subsidiary phase shift means for producing additional signals responsively to said first signal and displaced in phase from said first signal at angles substantially equal to the phase angles of the source, means for varying said variable phase shift means to simultaneously vary the phase of all of said signals, means for controlling the current in a first phase between the motor and the source responsively to said first signal, and means for controlling the currents in the other phases between the motor and the source responsively to different respective ones of said additional signals.

5. A polyphase A.C. motor control circuit comprising means for connecting a polyphase A.C. motor to a polyphase alternating current source, circuit means connected to the source for producing a first single phase signal, variable phase shift means including a controllable electric valve for varying the phase of said signal, a phase shift network for producing a second signal responsively to said first signal and displaced therefrom by a predetermined phase angle, means for controlling said valve to vary the phase of both of said signals in a predetermined manner, means for controlling the current in one phase between the motor and the source responsively to said first signal, and means for controlling the current in another phase between the motor and the source responsively to said second signal.

6. A braking current control circuit for supplying direct current to an alternating current motor for decelerating it comprising a phase shift controllable rectifier for connection between a source of alternating current and an A.C. motor to be decelerated, adjustable phase shift means for connection between the source and the rectifier for adjustably controlling the magnitude of the current flowing through said rectifier, means for connecting the motor to the source of alternating current for driving it and for disconnecting the motor from the source, means for blocking the flow of current through said rectifier, and means for causing current to flow through said rectifier for braking the motor for a predetermined period immediately following the time that the motor is disconnected from the driving A.C. source.

7. A braking current control circuit for supplying direct current to an alternating current motor for decelerating it comprising means for connecting an A.C. motor to an A.C. source and disconnecting it therefrom, phase shift controllable rectifier means for connection between the A.C. source and the motor for supplying direct current to the motor to brake it, means for normally blocking the flow of current through said rectifier means, control means for connection between the A.C. source and said rectifier means for causing current to flow through said rectifier means at a preselected rate, and means for actuating said control means for a predetermined period responsively to disconnection of the motor from the A.C. source.

8. A braking current control circuit for supplying direct current to an alternating current motor for decelerating it comprising means for connecting an A.C. motor to an A.C. source and disconnecting it therefrom, phase shift controllable rectifier means for connection between the A.C. source and the motor for supplying direct current to the motor to brake it, means for normally blocking the flow of current through said rectifier means, adjustable control means for connection between the A.C. source and said rectifier means for causing current to flow through said rectifier means at an adjustable preselected rate, means for adjusting said control means to vary said preselected rate, and means for actuating said control means for a predetermined period responsively to disconnection of the motor from the A.C. source.

9. A braking current control circuit for supplying direct current to an alternating current motor for decelerating it comprising switching means for controlling the flow of alternating current between a source thereof and an A.C. motor, a grid controlled gas tube rectifier having a D.C. output circuit connected to the motor, means for connecting said rectifier to an A.C. source, means for biasing said rectifier beyond cut-off, means for producing a signal voltage, means for applying said signal voltage to said rectifier to cause it to conduct, means for adjustably varying said signal producing means thereby to vary said signal voltage, and means for actuating said signal producing means for an adjustable predetermined time period responsively to operation of said switching means.

10. A braking current control circuit for supplying direct current to an alternating current motor for decelerating it comprising switching means for controlling the flow of alternating current between a source thereof and an A.C. motor, a grid controlled gas tube rectifier having a D.C. output circuit connected to the motor, means for connecting said rectifier to an A.C. source, means for biasing said rectifier beyond cut-off, phase-shift means for producing an A.C. signal voltage at a predetermined phase relative to the source, means for applying the signal voltage to said rectifier to cause said rectifier to conduct, means for adjusting said phase shift means thereby to vary the phase of said signal voltage relative to the source and thus to vary the D.C. output of said rectifier, actuating means responsive to said switching means for actuating said signal producing means for a predetermined time period immediately after said switching means cuts off the flow of alternating current to the motor, and an adjustable delay network associated with said actuating means for adjustably controlling the duration of said predetermined time period.

11. An electrical circuit for controlling the starting current of a polyphase A.C. motor and for supplying braking current to stop the motor comprising means for connecting a polyphase A.C. motor to a polyphase alternating current source, means for producing a signal, variable phase shift means for varying the phase of said signal, current control means for controlling the current flow between the motor and the source responsively to the phase of said signal, means for cutting off the current between the motor and the source in the absence of said signal, means for disabling said signal producing means and thereby causing the motor current from the source to be cut off, rectifier means for connection to an A.C. source for producing direct current, means for connecting said rectifier means to the motor for supplying direct current thereto to brake it, and means for controlling said rectifier means responsively to operation of said disabling means to cause said rectifier means to produce direct current for a predetermined period of time immediately following the time that said signal producing means is disabled.

12. An electrical circuit for controlling the starting current of a polyphase A.C. motor and for supplying braking current to stop the motor comprising means for connecting a polyphase A.C. motor to a polyphase alternating current source, means for producing a first signal, variable phase shift means for varying the phase of said signal, current control means for controlling the current flow between the motor and the source responsively to the phase of said signal, means for cutting off the current between the motor and the source in the absence of said signal, means for disabling said signal producing means and thereby causing the motor current from the source to be cut off, rectifier means for connection to an A.C. source for producing direct current, means for connecting said rectifier means to the motor for supplying direct current thereto to brake it, and means for controlling said rectifier means responsively to operation of said disabling means to cause said rectifier means to produce direct current for a predetermined period of time following a predetermined delay period immediately after the time that said signal producing means is disabled.

13. An electrical circuit for controlling the starting current of a polyphase A.C. motor and for supplying braking current to stop the motor comprising means for connecting a polyphase A.C. motor to a polyphase alternating current source, means for producing a first signal, variable phase shift means for varying the phase of said signal, current control means for controlling the current flow between the motor and the source responsively to variations in the phase of said signal, means for cutting off the current between the motor and the source in the absence of said signal, means for disabling said signal producing means and thereby causing the motor current from the source to be cut off, rectifier means for connection to an A.C. source for producing direct current, means for connecting said rectifier means to the motor for supplying direct current thereto to brake it, means for normally rendering said rectifier means non-conductive, a charge storage device, means for charging said storage device during times that alternating current is flowing between the motor and the source, means for discharging said storage device during times that no alternating current flows between the motor and the source, and means responsive to the charge on said storage device for causing said rectifier means to conduct and thereby to deliver direct current to the motor during the discharge time of said storage device.

14. A braking current control circuit for supplying direct current to an alternating current motor for decelerating it comprising a phase shift controllable rectifier for connection between a source of alternating current and an A.C. motor to be decelerated, adjustable phase shift means for connection between the source and the rectifier for adjustably controlling the magnitude of the current flowing through said rectifier, means for connecting the motor to the source of alternating current for driving it and for disconnecting the motor from the source, means for blocking the flow of current through said rectifier, and means for causing current to flow through said rectifier for braking the motor for a predetermined period immediately following the time that the motor is disconnected from the driving A.C. source comprising a capacitor, means for charging said capacitor during periods of energization of the motor, a selectively effective discharging circuit for said capacitor, and voltage responsive means controlled by said capacitor and effective to maintain said control means actuated during a preselected portion of the discharge period of said capacitor.

15. The combination of claim 14 in which said means for charging said capacitor comprises a rectifier and a transformer having a secondary winding connected to said rectifier and a primary winding connected to the motor and energized concurrently with the motor.

References Cited in the file of this patent
UNITED STATES PATENTS

| | | |
|---|---|---|
| 2,663,834 | Large et al. | Dec. 22, 1953 |
| 2,854,613 | Mowery | Sept. 30, 1958 |